April 25, 1939.　　　　O. B. RUFUS　　　　2,156,030
CLUTCH
Filed Oct. 23, 1936　　　　4 Sheets-Sheet 1
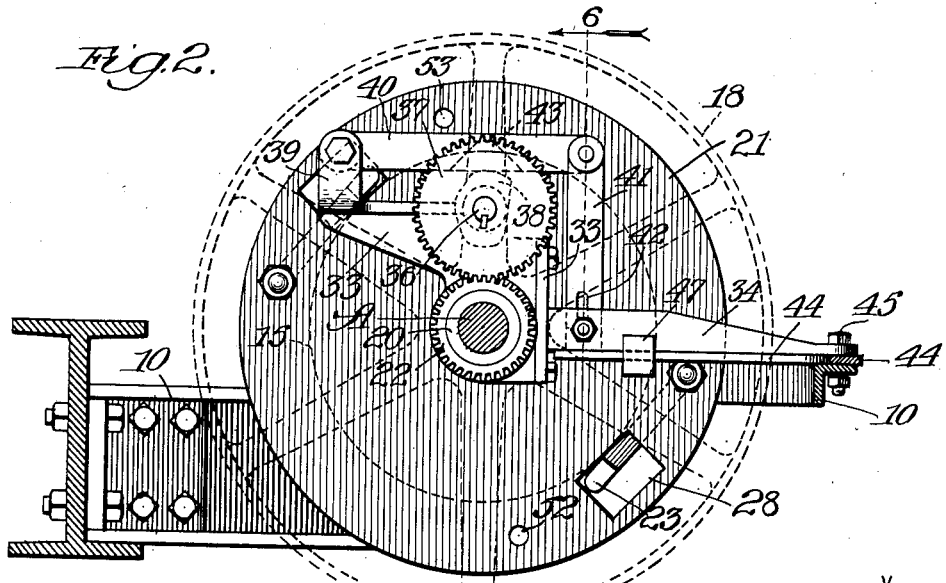
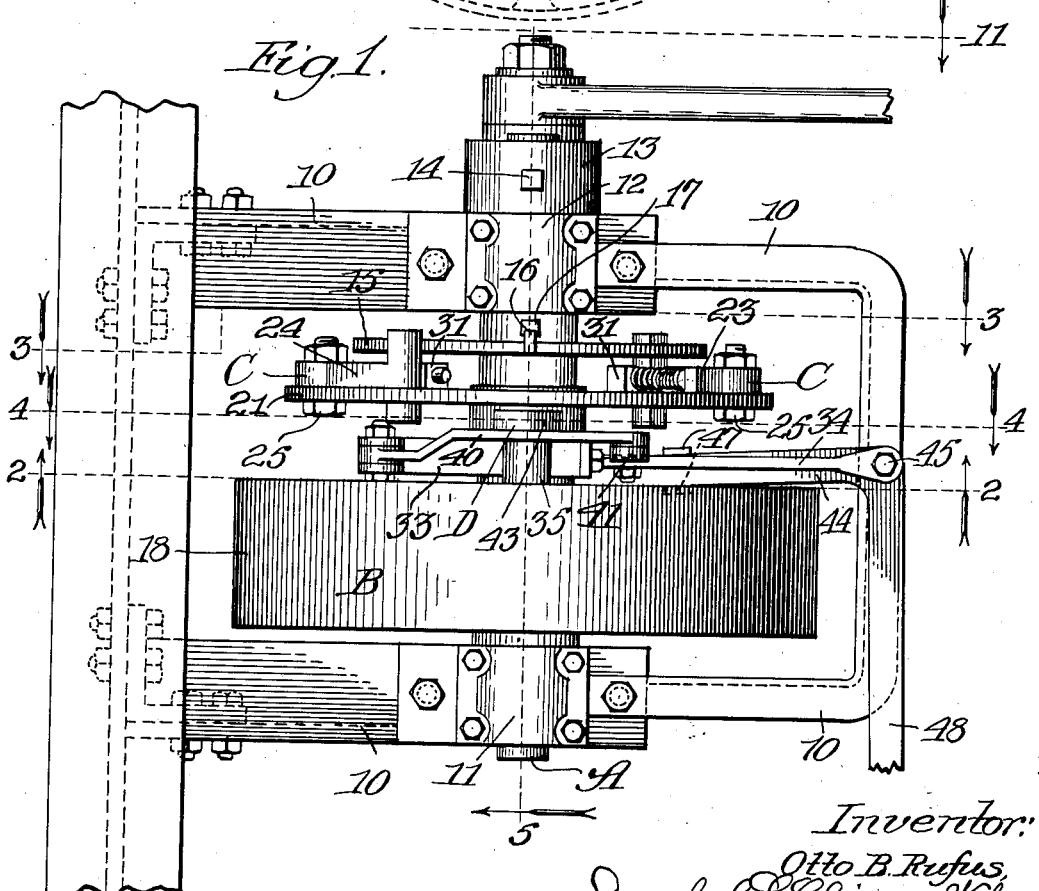
Inventor:
Otto B. Rufus,
By Dyrenforth, Lee, Chritton & Wiles,
Attys.

April 25, 1939.   O. B. RUFUS   2,156,030
CLUTCH
Filed Oct. 23, 1936   4 Sheets-Sheet 2
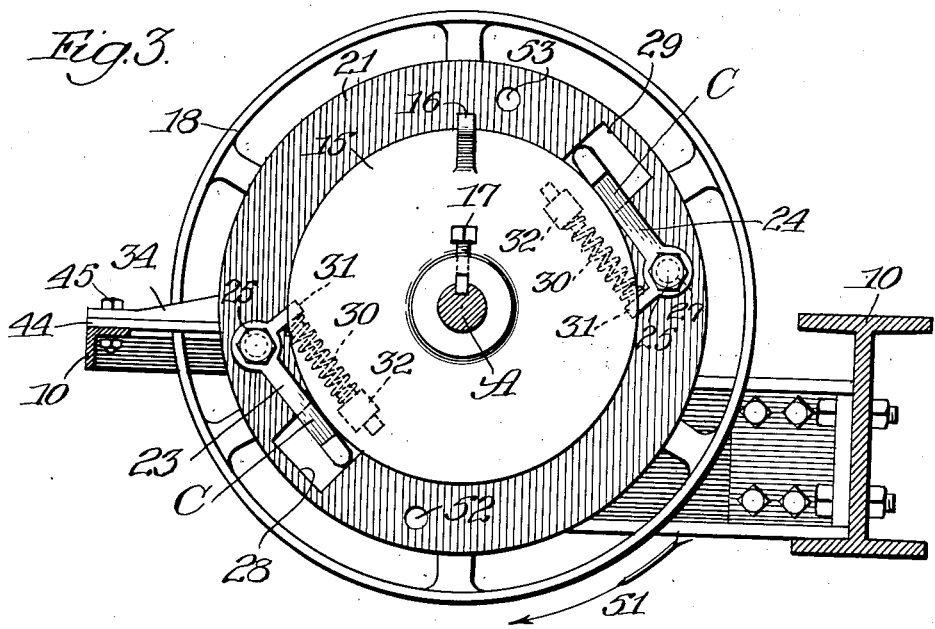
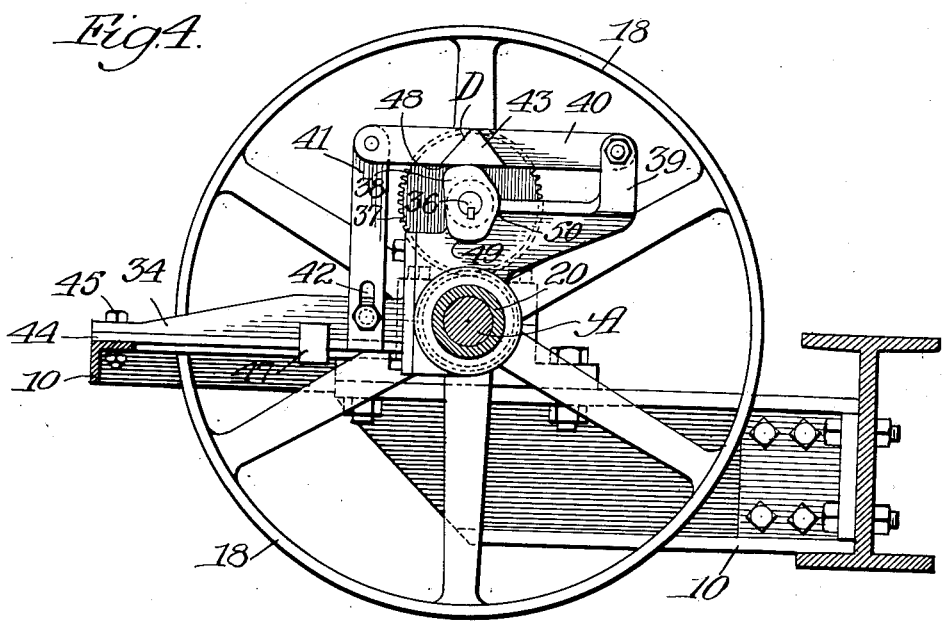
Inventor:
Otto B. Rufus

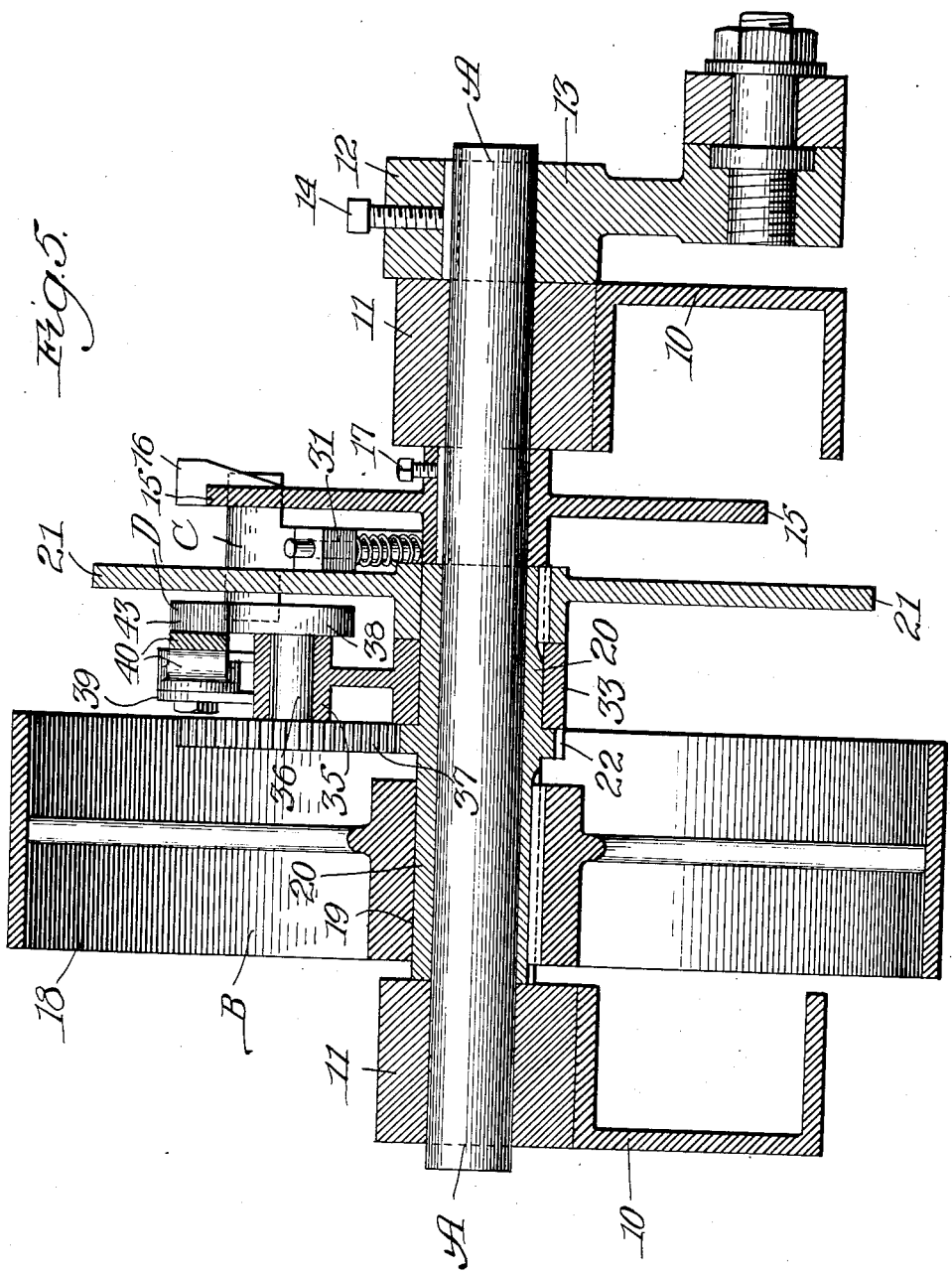

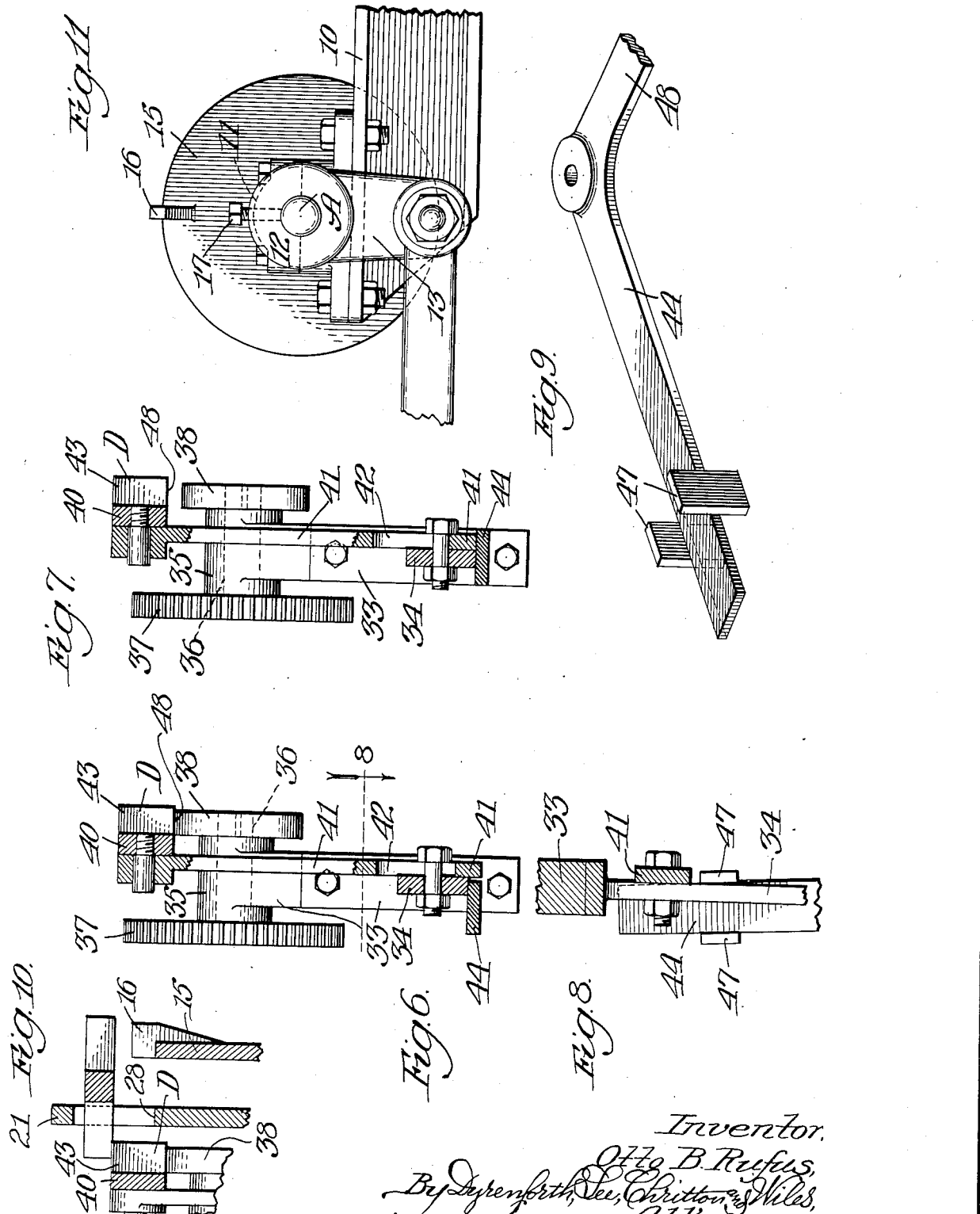

Patented Apr. 25, 1939

2,156,030

UNITED STATES PATENT OFFICE 2,156,030

CLUTCH

Otto B. Rufus, Chicago, Ill., assignor, by mesne assignments, to The Lathrop-Paulson Company, Chicago, Ill., a corporation of Illinois Application October 23, 1936, Serial No. 107,287

6 Claims. (Cl. 74—125.5)

This invention relates to a clutch and more particularly to a clutch for use in converting continuous motion into intermittent rotary motion.

An object of the invention is to provide an improved clutch by which uniform rotary movement is converted into interrupted rotary movement and in which the interrupted movement is controlled in a predetermined relationship with the uniform movement.

A more specific object is to provide a clutch by which uniform rotary movement is transmitted only two-thirds of some predetermined period of time. Another specific object is to provide a clutch by which uniform rotary motion is transmitted during one revolution of the driving mechanism with intervening intervals of one and a half revolutions.

Another object is to provide improved connecting means for engaging and disengaging the clutch members for producing interrupted rotary movement. Other objects and advantages appear as the specification proceeds.

A preferred embodiment is illustrated in the accompanying drawings in which—

Fig. 1 is a plan view of the device fully assembled; Fig. 2, a sectional view taken as indicated at line 2—2 of Fig. 1; Fig. 3, a sectional view taken as seen from line 3 of Fig. 1; Fig. 4, a sectional view taken as indicated at line 4—4 of Fig. 1; Fig. 5, a longitudinal sectional view, the section being taken as indicated at line 5 of Fig. 1; Fig. 6, a fragmentary sectional view, the section being taken at line 6 of Fig. 2, this view showing the shifting lever in position for intermittent engagement of the clutch members; Fig. 7, a view similar to Fig. 6, but showing the shifting lever in position for keeping the clutch members out of engagement; Fig. 8, a fragmentary sectional view taken as indicated at line 8 of Fig. 6; Fig. 9, a perspective view of the shifting lever; Fig. 10, a detail view of the means for engaging the clutch members, the parts being shown in disengaging position; and Fig. 11, a fragmentary view in end elevation, the view being taken as indicated at line 11 in Fig. 1.

As illustrated, A designates a shaft; B, drive mechanism; C, clutch engaging means; and D, control mechanism for regulating the engaging means C.

The shaft A, made of steel or other sturdy material, is rotatably mounted in frame 10, its ends being held in bearings 11 and 12. On one end it is equipped with a crank 13 which is secured to the shaft by a key 14ª confined by screw 14. Also secured to shaft A is the circular disk 15 which is equipped with projecting lug 16 at a point on its periphery. A screw 17 is employed to confine key 17ª in securing this disk to shaft A.

Drive mechanism B includes a drive wheel 18 which may be of any suitable construction capable of receiving rotary movement from some source of power. As illustrated, wheel 18 is adapted to accommodate a flat type belt and is provided with the central bore 19.

A sleeve 20, which extends about shaft A and is rotatable thereon, has its one end firmly secured within bore 19 of the drive wheel 18, and has its other end firmly secured to drive disk 21. It is also provided with the gear teeth 22 for engaging the control mechanism D.

The clutch engaging means C comprises the dogs 23 and 24 which are more clearly illustrated in Figs. 2 and 3. Dogs 23 and 24 are pivotally attached to drive disk 21 near its outside edge and at diametrically opposed points by means of bolts 25 extending through apertures 26 and 27 in the disk. The free end of dog 23 is provided with a transverse portion, one end of which extends to disk 15 for engaging lug 16, and the other end extends through an opening 28 in the drive disk for engaging with the control mechanism. Dog 24 is similarly arranged and has its free end extending transversely through opening 29 which is diametrically positioned with respect to opening 28. Each of dogs 23 and 24 is equipped with a coil spring 30 which extends between a lug 31 on the dog and one of posts 32 in disk 21 and operates to urge the free end of the dog inwardly to a position where it will engage the lug 16 on disk 15.

The control mechanism D includes a bracket member 33 which is rotatably mounted on sleeve 20, and has an arm 34 secured at its end to frame 10. Bracket 33 provides a transverse bearing 35 in which rotates a gear shaft 36. At one end of shaft 36 is secured a spur gear 37 which engages with teeth 22 of sleeve 20, and at the other end of the shaft is the cam 38.

Bracket member 33 also provides a supporting arm 39 to which one end of the cam lever 40 is pivotally connected. Cam lever 40 extends horizontally and at its other end is connected to the link 41 which is in turn connected through slot 42 to bracket member 33. At its central portion lever 40 is equipped on its side with a cam shoulder 43 which is adapted to contact one end of the free end portion of dogs 23 and 24 when the drive mechanism is actuated. Lever 40 rests upon cam 38 and is adapted to be moved up and down as cam 38 is rotated.

Associated with control mechanism D is the shifting lever 44, the form of which is clearly illustrated in Fig. 9. This lever is pivotally secured to the frame at 45 which may be the same point at which arm 34 is fastened. The body portion of lever 44 is equipped with stops 47 at its edge for engaging the sides of bracket arm 34 to limit the movement of lever 44. With lever 44 moved to the position shown in Fig. 7, its end supports the link 41 in raised position and thereby holds the cam lever 40 in raised position. But with lever 44 moved to its other extreme position as shown in Fig. 6 and Fig. 8, the end of this lever is clear of link 41 and the operation of lever 40 is not interfered with by shifting lever 44. For actuating lever 44, the extension 48 is provided; this may be in the form of a handle or may be equipped for connection with other control means.

Rotation of the drive wheel 18 and drive disk 21 causes rotation of the gear 37 by reason of its engagement with teeth 22. In this embodiment the relation between spur gear 37 and the drive wheel is of the order of two to three, the spur gear being adapted to rotate ⅔ of a revolution as the wheel 18 rotates one complete revolution.

The cam 38 is in such relation with drive disk 21 that as either of dogs 23 and 24 is passing cam shoulder 43, the cam is in one of three positions, either with one of the raised cam surfaces 48 and 49 in contact with lever 40, or with the lower cam surface 50 in contact with this lever.

Assuming that the lower cam surface 50 is in contact with lever 40 and that dog 23 is in engagement with lug 16 and is passing over cam shoulder 43, the operation is as follows: The disk 21 continues in engagement with disk 15 and the members remain in drive connection until the cam 38 is turned to position where the raised surface 48 is in contact with lever 40 and this lever thereby raised. Such a position is shown in Fig. 4. At this time the disk 15 and shaft A have been turned through one revolution and dog 24 is passing cam shoulder 43. The shoulder 43, being in raised position, causes the free end of dog 24 to be raised and to disengage from lug 16 of the disk 15. This action serves to disconnect the drive connection between the drive mechanism and shaft A, and disk 15 and shaft A cease to rotate. The relative positions of the parts at this point in the operation is clearly shown by Fig. 10 of the drawings.

Rotation of the drive mechanism continues and by the time dog 23 again passes cam shoulder 43 the cam 38 has been turned to a position where its raised surface 49 has lifted the lever 40. Dog 23 then is lifted by contact with cam shoulder 43 and thereby prevented from engaging lug 16 of disk 15.

However, when another half revolution of the drive mechanism takes place (the driven shaft still remaining at rest), the cam 38 will be turned a complete revolution and lower surface 50 will permit the lever 40 to drop to its lower position. Dog 24 then passing the cam shoulder 43 will not be raised but will be in position to engage lug 16 to place the clutch again in drive connection. This operation is then repeated.

Thus the clutch members are connected in drive relation for a duration of one revolution and then disconnected during a half revolution of the drive mechanism, after which they are again connected in drive relation for another full revolution. The dogs 23 and 24 alternate in effecting engagement, first one coming into engagement with lug 16, and then the other.

When it is desired to throw the clutch out of gear so that there will be no drive connection between the members, the shifting lever 44 may be turned to position where its end is under link 41 as shown in Fig. 7, in which position cam lever 40 is continuously held in raised position. This causes the cam shoulder to raise the dogs every time they pass, and drive connection is always prevented.

As above described the drive mechanism has been rotated in the direction indicated by the arrow 51 in Fig. 3. If it is desired to operate the clutch in the opposite direction, it is necessary only to remove the dogs from apertures 26 and 27 in which they are shown attached, turn the dogs over, and again attach them in apertures 52 and 53, the springs 30 engaging the posts 32 as before but on the opposite sides. With the dogs mounted in this position the clutch will operate as before except that the drive is in an opposite direction.

The clutch device as just described is particularly adated for use in applications where the speed of rotation is relatively low and where fast rotating speeds are not necessary. At relatively low speeds of rotation the load on the driven shaft causes this shaft to cease rotating immediately upon disengagement with the driving mechanism, and the dogs will not strike the lug 16 with such force as to be objectionable.

It is to be understood that the form of various of the parts may be greatly changed without changing the part they play in my invention. For instance, it is not essential that disks 15 and 21 be of circular plate form, but is essential only that they make connection in their respective mechanisms and contain the means for producing engagement. Also the control mechanism engaging the dogs may be mounted on one side or another of drive disk 21 as is convenient, and other of the parts may be axially shifted without changing their place in my invention.

Though the device, as illustrated, contains two dogs and one lug, if desired the number and position of the dogs and lugs may be varied to change the period of engagement or the interval between these periods.

The foregoing detailed description has been given for clearness of understanding only, and no unnecessary limitations should be understood therefrom, but the appended claims should be construed as broadly as permissible, in view of the prior art.

I claim:

1. In apparatus of the character set forth, drive mechanism including a rotatable drive member, a rotatable driven member, one of said members having a pair of diametrically opposed dogs and the other member being equipped with a single lug, said dogs being arranged so that upon rotation of said drive mechanism one of said dogs will normally engage said lug, and control mechanism for positioning said dogs so that each will engage said lug only once in every one and one-half revolutions of said drive member.

2. In apparatus of the character set forth, drive mechanism including a rotatable drive disk, a rotatable driven member, said disk having a dog mounted thereon and said member being equipped with a lug, said dog being arranged so as to engage said lug upon rotation of said drive disk in one direction, means for mounting said dog in another position so as to engage said lug upon rotation of said drive disk in another direction, and control mechanism for preventing said engagement during certain periods in the revolution of said drive mechanism.

3. In apparatus of the character set forth, drive mechanism including a rotatable drive member, a rotatable driven member, one of said members having a pair of diametrically opposed dogs and the other member being equipped with a single lug, said dogs being each adapted to engage said lug, and control mechanism for alternately disengaging each of said dogs from said lug at predetermined periods in the revolution of said drive mechanism.

4. In apparatus of the character set forth, drive mechanism including a rotatable drive member, a rotatable driven member, one of said members having a pair of diametrically opposed dogs and the other member being equipped with a single lug, said dogs being each adapted to engage said lug, and control means for effecting engagement of one of said dogs with said lug during periods of one revolution spaced by intervals of one-half revolution of said drive mechanism.

5. In apparatus of the character set forth, a driven shaft, a sleeve rotatably carried by said shaft, a drive pulley secured to said sleeve, a drive disk secured to said sleeve and equipped with dogging means, a driven disk secured to said shaft and having a lug adapted for engagement with said dogging means, a bracket carried by said sleeve between said pulley and said drive disk, a toothed gear carried by said bracket, said gear being in engagement with said sleeve, said sleeve being provided with teeth cooperating with the teeth of the gear in engagement therewith, a rotatable cam driven by said gear, a lever pivotally carried by said bracket and equipped with cam means for engaging said dogging means, said lever being in engagement with said rotatable cam and adapted upon actuation by said rotatable cam to move said dogging means to non-engaging position.

6. In apparatus of the character set forth, drive mechanism including a drive disk, a driven disk, one of said disks being circular and equipped with a lug extending beyond its peripheral edge, a dog pivotally mounted on one side and at the edge portion of the other of said disks, said dog having its free end in slidable engagement with the peripheral edge of said one disk and adapted to engage said lug, and cam means actuated by said drive mechanism for engaging the free end of said dog to move it to non-engaging position at predetermined intervals in the rotation of said drive mechanism.

OTTO B. RUFUS.